United States Patent [19]

Tha et al.

[11] Patent Number: 4,845,948

[45] Date of Patent: Jul. 11, 1989

[54] HYDRAULIC CIRCUIT WITH A BOOSTER CIRCUIT FOR OPERATING THE WORKING MEMBERS OF EARTH-MOVING MACHINES

[75] Inventors: Piero Tha, Valperga Canavese; Gerry Warren, Vignate, both of Italy

[73] Assignee: Trinova S.p.A., Vignate, Italy

[21] Appl. No.: 180,880

[22] Filed: Apr. 13, 1988

[30] Foreign Application Priority Data

Apr. 14, 1987 [IT] Italy .............................. 67306 A/87

[51] Int. Cl.[4] ............................................... F16D 39/00

[52] U.S. Cl. ......................................... 60/427; 60/460; 60/464; 91/518

[58] Field of Search ................. 60/466, 460, 464, 468, 60/494, 427, 459; 91/518

[56] References Cited

U.S. PATENT DOCUMENTS

| | | | |
|---|---|---|---|
| 3,625,007 | 12/1971 | Herndon, Jr. | 60/459 |
| 3,913,453 | 10/1975 | Parquet | 60/460 X |
| 4,732,076 | 3/1988 | Ewald | 60/460 X |
| 4,738,103 | 4/1988 | Tha | 60/427 |
| 4,739,617 | 4/1988 | Kreth et al. | 60/427 |

*Primary Examiner*—Edward K. Look

*Attorney, Agent, or Firm*—Sughrue, Mion, Zinn, Macpeak & Seas

[57] ABSTRACT

A hydraulic operating circuit for working members of earth-moving machines includes linear and rotary hydraulic actuators each of which is associated with a respective hydraulic distributor supplied from a principal supply and with a pressure compensator of the load-sensing type. A re-supply circuit is also associated with one or more of the rotary actuators for integrating the leakage and includes two anticavitation valves and a valve for boost-feeding the anticavitation valves from the principal supply.

9 Claims, 3 Drawing Sheets

Figure 1:
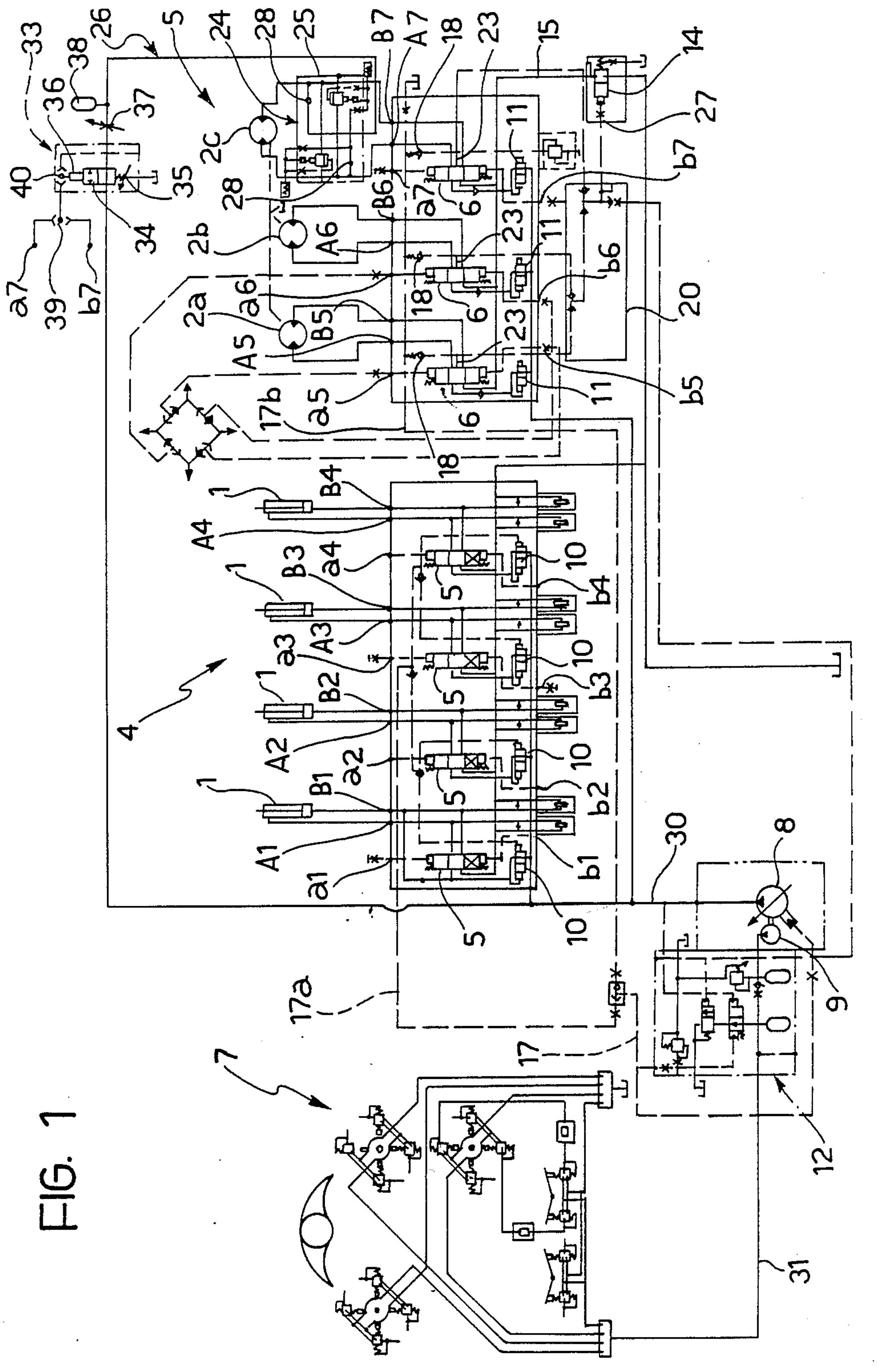

HYDRAULIC CIRCUIT WITH A BOOSTER CIRCUIT FOR OPERATING THE WORKING MEMBERS OF EARTH-MOVING MACHINES

The present invention relates in general to hydraulic circuits for operating the working members of earth-moving machines.

More particularly, the invention relates to a hydraulic operating circuit of the type including a principal supply of a pressurised hydraulic fluid and a plurality of hydraulic actuators, some linear and some rotary, for operating respective working members, each of which is associated with a respective hydraulic distributor with a continuously regulable shuttle which can be positioned, by servo-control means, in a first end position corresponding to displacement of the working member in a first direction, a central stop position and a second end position corresponding to displacement of the working member in a second direction, opposite the first, and pressure-compensation means of the load-sensing type associated with the principal supply and with the distributor, for keeping the difference between the pressure distributed by the principal supply and the the pressure of the working members substantially constant, in which the rotary hydraulic actuators are grouped together in a circuit separate from the linear hydraulic actuators and are provided with centralised valve braking means arranged to vary their resistance to discharge in dependence on the supply pressure; at least one of these rotary hydraulic actuators having associated cross-over valve means for recycling the flow from the pressure side to the suction side of the rotary actuator during braking of the actuator when the shuttle of the associated hydraulic distributor is in the central position, and a re-supply circuit for integrating the leakage through the cross-over valve means, including two anticavitation valves for recovering the leakage from the discharge side of the rotary actuator.

A hydraulic operating circuit of the type defined above is described and illustrated in European Patent Application No. 86830260.5 in the name of the Applicant. In this circuit, three rotary hydraulic motors are provided, the first two being used for translational maneouvres (right-left respectively) of the excavator and the third for rotation of the turret carrying the excavator arm.

During braking of the rotation of the turret, the third hydraulic motor, the shuttle of the associated hydraulic distributor is arranged in its central position and flow is recycled from the pressure side to the suction side by the cross-over valve means. The cross-over valve, whether of piloted or direct type, is not able to recycle 100% of the flow received due to its own leakage as well as the leakage of the pressure compensator and of the hydraulic motor itself. It is for this reason that the two anticavitation valves are used, their precise function being to reintegrate the leakage, taking it from the discharge of the rotary motor.

In conventional open-centre distributors, when the shuttle is in the central position, the discharge duct is traversed by the maximum flow from the principal supply pump which creates the back-pressure necessary for the re-supply passing through the discharge line, the filters, the associated heat exchanger and possible a back-pressure valve.

On the other hand, in closed-centre load-sensing distributors, when the shuttle is in the central position, no signal is sent to the load-sensing compensator of the principal pump which has a zero flow. The absence of any oil flow through the discharge duct to the reservoir thus renders the anticavitation valves inefficient through lack of back-pressure.

In this case re-supply is conventionally carried out by means of an auxiliary "booster" pump.

This solution is uneconomical and also ineffective most of the time due to the structural configuration of the "booster" pump, particularly when the pump is of the centrifugal type.

The object of the present invention is to solve the above problem, that is, to ensure the efficiency of the anticavitation valves while avoiding the need for an auxiliary booster pump.

According to the invention, this object is achieved by virtue of the fact that a hydraulic circuit for operating the working members of earth-moving machines of the type defined above is characterised in that the re-supply means comprise a valve for boost-feeding the anticavitation valves from the principal supply of hydraulic fluid.

In practice, the booster valve connects the delivery of the principal load-sensing pump to the anticavitation valves of the circuit for re-supplying the rotation hydraulic motor, providing it with flow at the necessary pressure.

The booster valve usually consists of a normally-closed, two-way pressure-reduction valve which is opened by the action of a resilient thrust load as a result of a signal indicating that the pressure re-supply circuit has fallen below a predetermined back-pressure corresponding to the value of the resilient thrust load. The booster valve thus acts as a switch, taking flow for the anticavitation valves only when this is actually required by the valves at the moment at which they depressurise the re-supply circuit to a pressure below the threshold value established by the resilient thrust load.

To advantage, this resilient thrust load is regulable.

A calibrated choke is conveniently inserted between the booster valve and the re-supply circuit, for controlling the maximum flow absorbed by the re-supply circuit.

A hydraulic accumulator is also normally provided downstream of the choke and is connected to the re-supply circuit to increase the response of the booster valve in the transitory stage Since, in normal operation with positive loads, the booster valve is connected, by means of the lower-pressure anticavitation valve, to the discharge line to the reservoir, it is necessary for the back pressure of the re-supply circuit to be higher than the threshold value of the booster valve, in order to prevent leakage from the principal circuit. To obtain this effect, a pressuring signal derived from the servo-control means associated with the hydraulic distributor of the rotary motor is conveniently supplied to the booster valve through a logic system of selector valves so as to keep this booster valve closed in operative conditions in which the shuttle of the associated hydraulic distributor is not in the central position. This enables the booster valve to be closed when the shuttle of the distributor is in positions other than the central one, ensuring that it re-opens when the shuttle of the distributor is in the central position.

As well as maintaining the efficiency of the anticavitation valves of the hydraulic motor for rotating the turret, the booster valve according to the invention can be used for a secondary anticavitation function for the two rotary hydraulic translation motor. For this purpose, the booster valve may also be connected to at least one of the other two rotary hydraulic motors on its supply and discharge sides through respective anticavitation valves and antishock valves. In this case the booster valve is conveniently provided with a third line for connecting these antishock valves to discharge through the re-supply circuit.

The centralised, valve braking means of the operating circuit comprise, in known manner, a normally-closed compensator valve inserted in a common discharge line of the rotary hydraulic actuators, which valve is opened by means of a pilot pressure signal corresponding to the lowest value of the supply pressure to these actuators. When the booster valve according to the invention is also connected to the supply and discharge sides of the other two rotary hydraulic actuators (that is, the two translation motors) through respective pairs of anticavitation valves, the pilot pressure signal for the compensator valve for the centralised braking system is supplied to the booster valve through a selector valve which controls communication by means of the depressuring signal of the supply circuit.

In this way, the booster valve is able to provide flow to the two translation motors even when the shuttle of the associated distributors are not in their central positions.

In this case, when the respective shuttle is in its central position, the hydraulic distributor of the rotation motor is formed in such a way as to connect the suction and discharge sides of the rotation motor through respective one-way valves, by means of the pilot pressure signal of the compensator valve for the centralised braking system.

With this solution, when none of the hydraulic motors is in cavitation, the piloting pressure of the compensator valve of the centralised braking system decreases, and the booster valve opens, re-supplying the motor on the suction side, whilst, at the same time, the compensator valve of the centralised braking system restricts the discharge.

Figure 2:
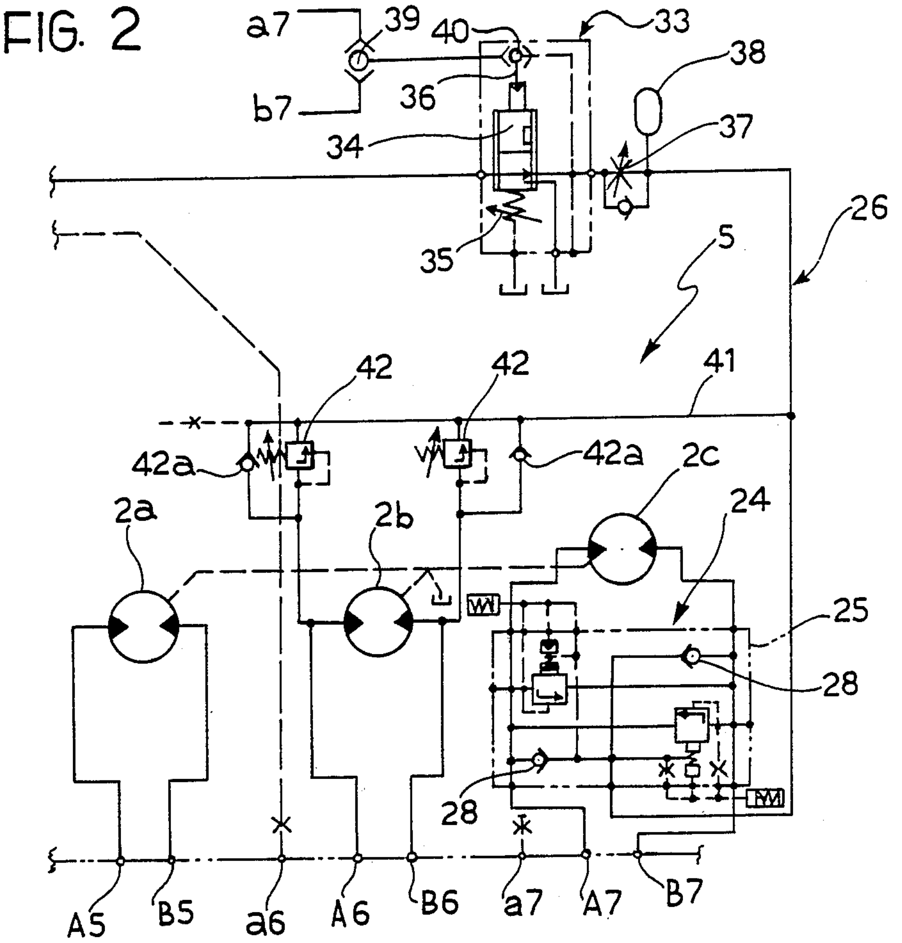
Figure 4:
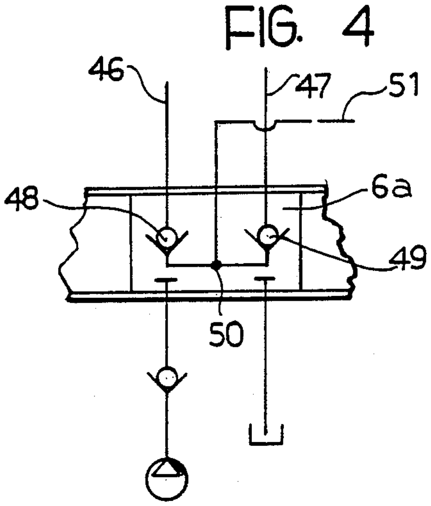
Figure 3:
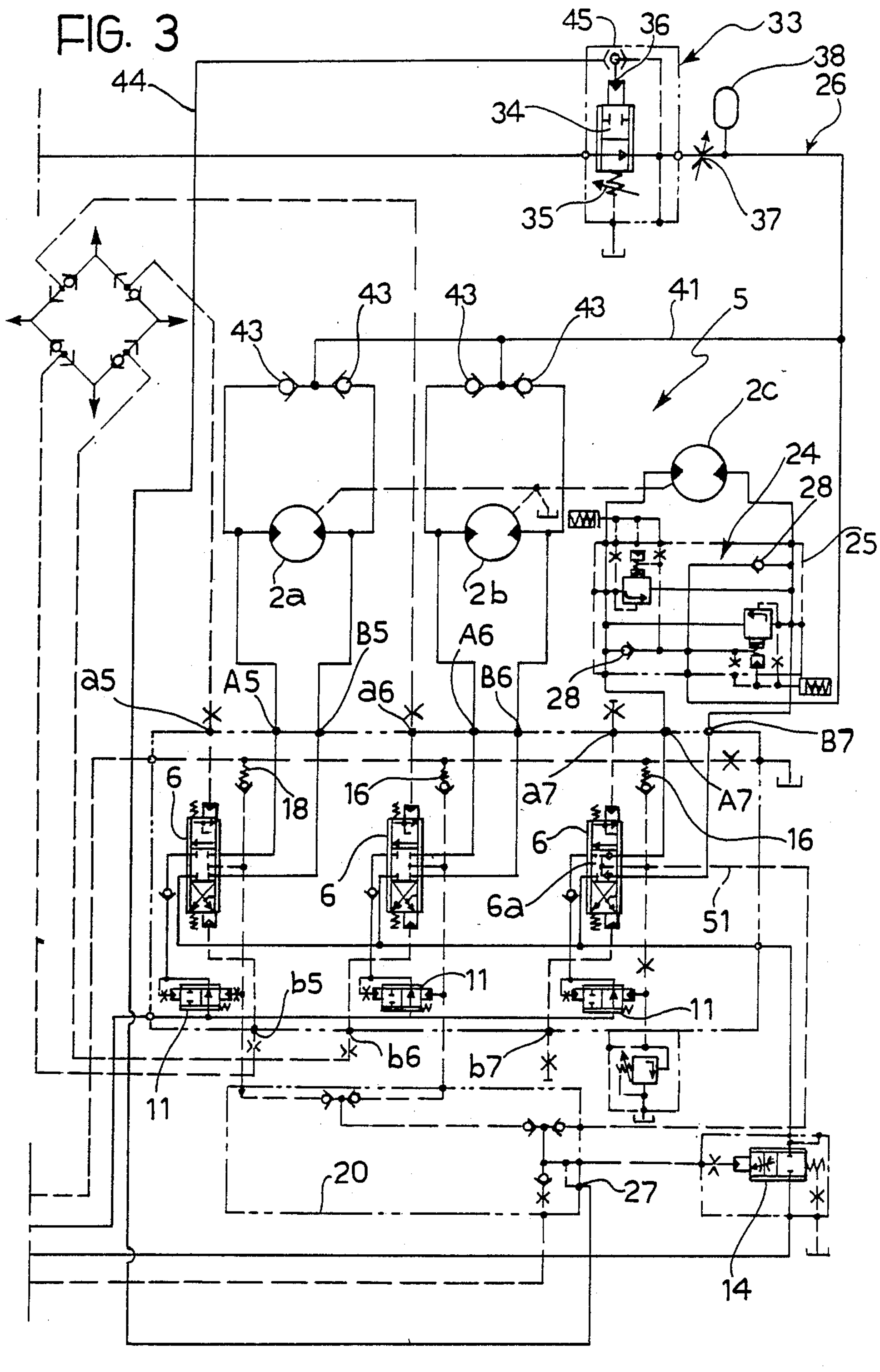

Further characteristics of the invention will become clear from the detailed description which follows, with reference to the appended drawings, provided purely by way of non-limiting example, in which:

FIG. 1 shows the layout of a hydraulic operating circuit according to the invention, FIG. 2 shows a first variant of part of the circuit of FIG. 1, FIG. 3 shows a second variant of part of the circuit of FIG. 1, and FIG. 4 shows a detail of FIG. 3 on an enlarged scale.

In FIG. 1, the essential components of a hydraulic circuit for operating the working members of an earth-moving machine are illustrated schematically. In the example illustrated, the working members comprise a series of linear hydraulic actuators for operating the excavator arm (position-raising- penetration-excavation) of the machine, and a series of rotary hydraulic motors 2*a*, 2*b*, 2*c* for translational manoeuvres (right-left) of the excavator and rotation of the turret carrying the excavator arm.

The rotary motors 2*a*, 2*b*, 2*c* are grouped in a unit, generally indicated 3, which is distinct and separate from the unit, indicated 4, of the linear actuators 1.

Respective distributors 5, 6 are connected to the two units 3, 4 respectively, for the supply and discharge of the actuators 1 and 2*a*, 2*b* and 2*c*. Each distributor 5, 6 has a shuttle which can be placed in three positions, corresponding respectively to movement of the respective actuator 1, 2*a*, 2*b*, 2*c* in a first direction, stoppage of the actuator, and movement of the actuator in a second direction opposite the first. The stop position is that in which the shuttle is in the central position illustrated in the drawing.

The inlet-outlet connections between the distributors 5, 6 and their associated actuators 1, 2*a*, 2*b*, 2*c* are indicated $A_1$, $B_1$ . . . $A_7$, $B_7$, in the drawing.

The shuttles of the distributors 5, 6 are set in their three possible positions by means of hydraulic pilotage achieved through a servo-control valve unit, generally indicated 7, including, in known manner, a series of control levers and pedals which can be placed manually in various positions corresponding to the various conditions of the distributors 5, 6. The piloting inlet-outlet connections between the servo-controls 7 and the distributors 5, 6 are indicated $a_1$, $b_1$ . . . $a_7$, $b_7$ respectively.

The distributors 5, 6 (and thus the working members 1, 2*a*, 2*b* 2*c*) and the servo-controls 7 are supplied, in the case of the example illustrated, by means of two separate hydraulic pumps 8, 9 through respective supply lines 30, 31.

The pump 8 is provided with a known control of the load-sensing type formed by means of a control circuit 17 including a line 17*a* associated in conventional manner with the unit 4, and a line 17*b* associated with the unit 3 and including selector valves 18 consisting, in effect, of simple non-return ball valves, inserted in correspondence with signal outlets 23 by means of which a load-sensing pressure signal is derived, which is greater than those coming, in operation, from the distributors 6.

The distributors 5, 6 have respective associated compensators 10, 11 constituted by control valves which, in known manner, operate to keep the difference between the pressure distributed by the pump 8 and that of the working members 1, 2*a*, 2*b*, 2*c* substantially constant in use, in order to ensure that the various possible working movements of the machine occur simultaneously, whatever the loads controlled.

The hydraulic serv-control devices 7 are supplied by the pump 9 through a control circuit, generally indicated 12, whose function is to prevent conditions of saturation arising. The manner in which the circuit 12 operates is described and illustrated in European Patent Application No. 191,275 of which the Applicant is cotitular.

Valve braking means associated with the rotary hydraulic motors 2*a*, 2*b*, 2*c* are piloted by the pressure in the supply line of these motors and are arranged to vary the resistance of the motors to discharge in dependence on the pressure existing in the supply line. In practice, the function of these braking means is to achieve braking of the hydraulic motors 2*a*, 2*b*, 2*c* in such a way that the rate of rotation of the motors is independent of the load applied to them and is, on the other hand, controlled solely by the flow of fluid to the inlet of the motors.

The valve braking means consist of a single, centralised compensator valve 14 consisting of a normally-closed, two-way, directional control valve inserted in a discharge line 15 common to the three distributors 6. The compensator valve 14 is subject to the action of a piloting pressure from a logic system of selector valves, generally indicated 20. The output of the system 20 is connected to a piloting inlet 27 of the valve 14. The manner in which the centralised braking system operates is described and illustrated in European Patent Application No. 86830260.5 in the name of the Applicant.

A flow recovery circuit 25 is associated with the rotary hydraulic motor 2c and includes a cross-over valve system, generally indicated 24, for recycling the flow from the pressure side of the suction side of the motor 2c during its braking phase, that is, when the shuttle of the associated hydraulic distributor 6 is in the central position.

The characteristics of the flow recovery circuit 25 are described and illustrated in detail in European Patent Application No. 87830015.1 in the name of the Applicant. For the purposes of the present invention, it suffices to say that the cross-over valve 24 includes a pair of one-way anticavitation valves 28, essential for reintegrating the leakage (due to leakage through the cross-over valve 24 itself, leakage of the shuttle of the compensator 11 and of the hydraulic motor itself), the leakage being recovered from the discharge side of the motor 2c.

In order to maintain the efficiency of the anticavitation valves 28 when the hydraulic distributor 6 of the motor 2c is in the braking position, that is, with the associated shuttle in the central position, the invention provides a re-supply circuit 29 which connects the delivery of the pump 8 to the anticavitation valves 26, providing them with flow at the necessary pressure.

The re-supply circuit 29 includes a booster valve 33, consisting in practice of a two-way pressure-reducing valve whose shuttle 34 is acted upon on one side by a thrust spring 35 of regulable load, which urges it into the open position against the action of a pressure signal from the circuit 29, downstream of the valve 33, and supplied to a piloting inlet 36 of the valve 33 on the side opposite the spring 35. In practice, the booster valve 33 acts as a switch, taking flow for the anticavitation valves 28 from the pump 8 only when this flow is actually required by the valves 28 themselves, that is, when they are depressuring the piloting inlet 36 to a pressure below a threshold established by the calibration of the spring 35. The maximum flow absorbed when the shuttle 34 is in the open condition is determined by the capacity of a regulable calibrator 37, and a hydraulic accumulator 38 arranged downstream of the calibrator 37 enables the transitory response of the valve 33 to be increased.

Since, in normal operation with positive loads, the booster valve 33 is connected by means of the lower-pressure anticavitation valve 28 to the discharge line of the motor 2c, it is necessary for the back pressure in the circuit 26 to be greater than the threshold value of the booster valve 33 in order to avoid leakage from the principal circuit. In order for this to occur in all operative conditions, including transitory states, a piloting signal is derived from the connections $a_7$, $b_7$ to the servo-controls 7, by means of which it is possible through first and second selector-valve logic systems 39, 40 to cause the booster valve 33 to close when the shuttle of the distributor 6 associated with the motor 2c is not the central position, the booster valve 33 re-opening when the distributor 6 returns to the central position.

The variant of FIG. 2 illustrates the case in which the booster valve 33 is used for one of the two translation motors, in particular the motor 2b, as well as for the motor 2c. In this case, the re-supply circuit 26 is connected, through a line 41, to the supply and discharge sides of the motor 2b through respective anti-shock valves 42 and anticavitation valves 42a, and the shuttle 34 of the booster valve 33 has a three-way configuration in order to discharge the valves 42 to the reservoir through the re-supply circuit 26. It should be noted that direct discharge of the two anti-shock valves 42 is in all cases blocked by the compensator valve 14 of the centralised braking system.

The variant of FIG. 3 illustrates, on the other hand, the case in which the booster valve 33 is arranged to operate for both the translation motors 2a and 2b as well as for the rotation motor 2c. In this case, the line 41 of the re-supply circuit 26 is connected to the supply and discharge sides of the two motors 2a, 2b through respective pairs of anticavitation valves 43. Since the booster valve 33 must be able, in this case, to provide flow to the two translation motors 2a, 2b even when the shuttles of the respective hydraulic distributors 6 are not in the central position, the pressure signal coming, in the case of FIG. 1, from the servo-control 7 is replaced by a pressure signal coming from the pressure outlet 27 of the compensator valve 14 of the centralised braking system. This pressure signal reaches the inlet 36 of the booster valve 33 through a circuit 44 and a selector valve 45 which controls communication between the inlet 36 and the depressurization signal of the re-supply circuit 26. In this case, the shuttle 34 of the booster valve 33 can have the two-stay configuration illustrated in FIG. 3 and corresponding to that of FIG. 1, or the three-way configuration of FIG. 2.

Moreover, in this case, the shuttle of the hydraulic distributor 6 associated with the rotation hydraulic motore 2c, indicated 6a, has a configuration which differs from the conventional one illustrated in FIG. 1. As illustrated in greater detail in FIG. 4, the central section of this shuttle 6a is formed so that, in the central neutral position, it interconnects the supply and discharge lines of the motor 2c through two respective lines 46, 47 including one-way valves 48, 49, and through a duct 50, and connects these with the signal outlet 27 of the compensator valve 14 for the centralised braking system, through a duct 51.

When none of the motors 2a, 2b, 2c is in cavitation, the pressure at the piloting outlet 27 of the compensator valve 14 keeps the booster valve 33 closed, through the circuit 44, to avoid leakage to the reservoir. When one of these motors is in cavitation, the pressure at the outlet 27 decreases and the shuttle 34 of the booster valve 33 moves into the open position, re-supplying the motor on the suction side whilst, at the same time, the shuttle of the compensator valve 14 of the centralised braking system restricts the discharge. The conformation of the shuttle 6a of the distributor 6 associated with the rotation motor 2c enables its suction and discharge lines to be connected to the centralised braking system so as to obtain the booster effect even, and above all, when the shuttle 6a is in the central neutral position.

We claim:

1. A hydraulic circuit for operating working members of earth-moving machines, including a principal supply means of pressurised fluid and a plurality of linear and rotary hydraulic actuators connected to said supply means for operating said respective working members, each of said actuators being connected to a respective hydraulic distributor having a continuously regulatable shuttle, servo-control means connected to each distributor for moving each shuttle into a first end position corresponding to displacement of the working member in a first direction, into a central position corresponding to stoppage of the working member, and into a second end position corresponding to displacement of the working member in a second direction opposite the first, and pressure-compensation means of the "load-sensing" type operatively connected with the principal supply means and with the distributors for keeping the difference between the pressure distributed by the principal supply means and the pressure of the working members substantially constant, wherein the rotary hydraulic actuators are grouped together in a circuit separate from the linear hydraulic actuators and are provided with centralised valve braking means arranged to vary their resistance to discharge in dependence on the supply pressure; at least one of said rotary hydraulic actuators having associated cross-over valve means for recycling flow from the pressure side to the suction side of the rotary actuator during braking of the actuator when the shuttle of the associated hydraulic distributor is in the central position, and a re-supply circuit means for integrating the leakage through the cross-over valve means, including two anticavitation valves connected to said cross-over valve means for recovering the leakage from the discharge side of the rotary actuator, and wherein the re-supply means comprise a booster valve for boost-feeding the anticavitation valves from the principal supply means of hydraulic fluid.

2. A circuit according to claim 1, wherein the booster valve consists of a normally-closed, two-way pressure-reducer valve which is opened, by the action of a resilient thrust load, as a result of a signal indicating the pressure of the re-supply circuit has fallen below a predetermined back pressure corresponding to the value of the resilient thrust load.

3. A circuit according to claim 2, wherein the resilient thrust load is regulable.

4. A circuit according to claim 2 wherein a calibrated choke is inserted between the booster valve and the re-supply circuit for controlling the maximum flow absorbed by the re-supply circuit.

5. A circuit according to claim 4, wherein a hydraulic accumulator is connected to the resupply circuit downstream of the choke.

6. A circuit according to claim 2, wherein a pressurisation signal derived from the servo-control means associated with the hydraulic distributor of the rotary actuator is also supplied to the booster valve through a logic system of selector valves to keep the booster valve in the closed position in operative conditions in which the shuttle of the hydraulic distributor is not in the central position.

7. A circuit according to any one of claim 2 wherein the booster valve is also connected to at least one other of the rotary actuators on its supply and discharge sides through respective anti-shock valves and anticavitation valves and is provided with a third line for connecting these anti-shock valves to discharge through the re-supply circuit.

8. A circuit according to any one of claim 2 in which the centralised valve braking means comprise a normally-closed compensator valve inserted in a discharge line common to the rotary hydraulic actuators which is opened by means of a piloting pressure signal corresponding to the lowest value of the supply pressure to the rotary actuators, wherein the booster valve is also connected to the supply and discharge sides of the other rotary actuators by means of respective pairs of anticavitation valves, and in that the piloting pressure signal for the compensator valve for the centralised braking system is also supplied to the booster valve through a selector valve which controls communication by means of the depressurisation signal of the re-supply circuit (26).

9. A circuit according to claim 8, wherein the hydraulic distributor of the rotary actuator connected to the cross-over discharge valve means is formed in such a way as to connect the suction and discharge sides of the rotary actuator with the piloting pressure signal of the compensator valve for the centralised braking system through respective one-way valves when the associated shuttle is in the central position.

* * * * *